US009100659B2

(12) United States Patent
Pandit et al.

(10) Patent No.: US 9,100,659 B2
(45) Date of Patent: Aug. 4, 2015

(54) MULTI-VIEW VIDEO CODING METHOD AND DEVICE USING A BASE VIEW

(75) Inventors: Purvin Bibhas Pandit, Franklin Park, NJ (US); Yeping Su, Plainsboro, NJ (US); Peng Yin, West Windsor, NJ (US); Cristina Gomila, Pirnceton, NJ (US); Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1505 days.

(21) Appl. No.: 12/224,814

(22) PCT Filed: Feb. 27, 2007

(86) PCT No.: PCT/US2007/004997
§ 371 (c)(1),
(2), (4) Date: Sep. 4, 2008

(87) PCT Pub. No.: WO2007/126511
PCT Pub. Date: Nov. 8, 2007

(65) Prior Publication Data
US 2009/0185616 A1      Jul. 23, 2009

Related U.S. Application Data

(60) Provisional application No. 60/787,092, filed on Mar. 29, 2006.

(51) Int. Cl.
*H04N 7/12*         (2006.01)
*H04N 19/577*       (2014.01)
(Continued)

(52) U.S. Cl.
CPC ........... *H04N 19/577* (2014.11); *H04N 19/107* (2014.11); *H04N 19/136* (2014.11); *H04N 19/176* (2014.11); *H04N 19/46* (2014.11);
(Continued)

(58) Field of Classification Search
USPC ............................................. 375/240–240.09
See application file for complete search history.

(56) References Cited

U.S. PATENT DOCUMENTS 5,557,331 A      9/1996   Honjo
5,619,256 A  *   4/1997   Haskell et al. .................. 348/43
(Continued)

FOREIGN PATENT DOCUMENTS

CN              1596536 A       3/2005
EP              1389020 A1      2/2004
(Continued)

OTHER PUBLICATIONS

Wang, Ye-Kui and Hannuksela, Miska, "Signaling of scalability information", JVT of ISO/IEC MPEG & ITU-T VCEG, 16th meeting: Poznan, Poland (Jul. 24-29, 2005).*
(Continued)

*Primary Examiner* — Benjamin Lamont
(74) *Attorney, Agent, or Firm* — Robert D. Shedd; Julia Tanase

(57) ABSTRACT

There are provided method and apparatus for use in a multi-view video coding system. The apparatus includes an encoder for encoding at least two views corresponding to multi-view video content into a resultant bitstream, wherein the resultant bitstream is encoded to include view specific information. The view specific information indicates a decoding interdependency between at least some of the at least two views.

10 Claims, 4 Drawing Sheets

(51) Int. Cl.
*H04N 19/597* (2014.01)
*H04N 19/176* (2014.01)
*H04N 19/70* (2014.01)
*H04N 19/46* (2014.01)
*H04N 19/61* (2014.01)
*H04N 19/107* (2014.01)
*H04N 19/136* (2014.01)

(52) U.S. Cl.
CPC ............ *H04N19/597* (2014.11); *H04N 19/61* (2014.11); *H04N 19/70* (2014.11)

(56) References Cited

U.S. PATENT DOCUMENTS

| | | | |
|---|---|---|---|
| 5,736,943 | A | 4/1998 | Herre et al. |
| 5,771,081 | A | 6/1998 | Lee |
| 5,907,178 | A | 5/1999 | Baker et al. |
| 6,055,012 | A * | 4/2000 | Haskell et al. ............ 348/48 |
| 6,055,274 | A | 4/2000 | McVeigh |
| 6,151,362 | A | 11/2000 | Wang |
| 6,192,186 | B1 | 2/2001 | Murashima et al. |
| 6,999,513 | B2 | 2/2006 | Sohn et al. |
| 7,333,661 | B2 | 2/2008 | Takahashi et al. |
| 7,903,737 | B2 | 3/2011 | Martinian et al. |
| 7,961,786 | B2 | 6/2011 | Holcomb |
| 8,022,951 | B2 | 9/2011 | Zhirkov et al. |
| 8,027,386 | B2 | 9/2011 | Boyce et al. |
| 8,107,744 | B2 | 1/2012 | Tian et al. |
| 8,155,186 | B2 | 4/2012 | Murakami et al. |
| 8,369,406 | B2 | 2/2013 | Kim et al. |
| 2002/0012315 | A1 | 1/2002 | Iida et al. |
| 2002/0110193 | A1* | 8/2002 | Yoo et al. ............ 375/240.02 |
| 2003/0095119 | A1 | 5/2003 | Jeong et al. |
| 2003/0156718 | A1 | 8/2003 | Candelore et al. |
| 2005/0031035 | A1 | 2/2005 | Vedula et al. |
| 2005/0094726 | A1 | 5/2005 | Park |
| 2005/0185712 | A1* | 8/2005 | Lee ............ 375/240.1 |
| 2006/0013490 | A1* | 1/2006 | Sun ............ 382/232 |
| 2006/0026646 | A1 | 2/2006 | Lou et al. |
| 2007/0041442 | A1 | 2/2007 | Novelo |
| 2007/0110150 | A1 | 5/2007 | Wang et al. |

FOREIGN PATENT DOCUMENTS

| | | |
|---|---|---|
| JP | 09-261653 | 10/1997 |
| JP | 09261653 | 10/1997 |
| JP | 2007-259433 | 10/2007 |
| JP | 2009-502084 | 1/2009 |
| KR | 19980007751 | 3/1998 |
| KR | 1019980007751 A | 3/1998 |
| KR | 1020050034889 A | 4/2005 |
| KR | 1020050084678 A | 8/2005 |
| KR | 1020050098261 A | 10/2005 |
| KR | 20050084678 | 10/2007 |
| KR | 20050034889 | 6/2010 |
| KR | 20050098261 | 2/2011 |
| RU | 2124272 C1 | 12/1998 |
| RU | 2001105183 | 6/2003 |
| RU | 2237283 C2 | 9/2007 |
| WO | WO 99/65239 | 12/1999 |
| WO | 2005/083636 A1 | 9/2005 |
| WO | WO2006001653 A1 | 1/2006 |
| WO | 2006/016418 A1 | 2/2006 |

OTHER PUBLICATIONS

Puri, A., Kollarits, R., Haskell, B., Basics of Stereoscopic Video, New Compression Results with MPEG-2 and a Proposal for MPEG-4, Signal Processing: Image Communication, vol. 10, pp. 201-234 (1997).*
Li et al., "A novel multi-view video coding scheme based on H.264", Proceedings of the 2003 Joint Conference of the Fourth International Conference on Information, Communications and Signal Processing and the Fourth Pacific Rim Conference on Multimedia, vol. 1 pp. 493-497, Dec. 15, 2003.
Reichel et al., "Scalable Video Coding—Joint Draft 4", Joint Video Team (JVT) of ISO/IEC MPEG & ITU-T VCEG (ISO/IEC JTC1/SC29/WG11 and ITU-T SG16 Q.6), 17th Meeting: Nice, France, Oct. 28, 2005, [JVT-Q201].
Ohhubo, "H.264/AVC Text", p. 97, Impress K.K., Aug. 11, 2004. (translation attached).
Guo et al., Viewpoint switching in multiview video streaming, IEEE International Symposium on Circuits and Systems, 2005, ISCAS 2005, May 23-26, 2005, section 3B, fig. 2.
Hannuksela et al., "Isolated Regions in Video Coding", IEEE Transactions on Multimedia, vol. 6, No. 2, Apr. 2004.
Kimata et al. "Free-viewpoint Video Communication Using Multi-view Video Coding", NTT Technical Review, Aug. 2004, vol. 2, No. 8, pp. 21-26.
International Organization for Standardization (ISO) 2382-1:1993, available online at: http://www.morepc.ru/informatisation/iso2381-1.html.
Nevdyaev, Telecommunication Technologies, English-Russian explanatory dictionary-guide, Moscow, 2002, p. 490.
Kimata et al., "System Design of Free Viewpoint Vidoe Communiaton", The Fourth International Conference on Computer and Information Technology 2004, (CIT '04), Sep. 14, 2004, p. 52-59.
Collins et al, "An Active Camera System for Acquiring Multi-View Video", Proceedings of the 2002 International Conference on Image Processing (ICIP '02), Sep. 2002, pp. 517-520, Broadcast Solution Guide, Issue 1, Sep. 2005 [retrieved on Aug. 19, 2010]. Retrieved from Internet <URL: http://www.xilinx.com/publications/archives/solution_guides/broadcast.pdf>.
Kimata et al., Multi-View Video Coding Using Reference Picture Selection for Free-Viewpoint Video Communication, NTT Cyber Space Laboratories, NTT Corporation, Picture Coding Symposium (PCS), 2004.
Sohn et al., "H264/AVC-compatible Multi-View Video Coding", International Organisation for Standardisation, ISO/IEC JTC1/SC291WG11, Bangkok, Thailand, Jan. 2006.
Lee et al., "H.264/MPEG-4 AVC-Based Multi-View Video Coding (MVC)", International Organization for Standardization, ISO/IEC JTC11SC291WG11, Bangkok, Thailand, Jan. 2006.
Wang et al., "Signaling of Scalability Information", JVT of ISO/IEC MPEG & ITU-T VCEG, Document: JVT-P061, 16th Meeting: Poznan, Poland, Jul. 24-29, 2005.
Martinian et al., "V-Picture Syntax for Random Access in Multi-View Video Compression", International Organisation for Standardisation, ISO/IEC JTC1/SC291WG11, Montreaux, Switzerland, Apr. 2006.
Wiegand et al.: "Text of ISO/IEC 14496-10: 2006/PDAM3 Scalable Video Coding," Joint Video Team (JVT) of ISO/IEC MPEG & ITU-T VCEG, ISO/IEC JTC 1/SC 29/WG11, N7795, Jan. 2006, Bangkok, Thailand. Complete document 505 pages.
ISO/IEC Standard, "Requirements on Multi-View video Coding v.5", International Organsiation for Standardisation, ISO/IEC JTC1/SC29NVG11, N7539, Nice France, Oct. 2005.
Sullivan et al.: "Text of ISO/IEC 14496 10 Advanced Video Coding 3rd Edition," Joint Video Team (JVT) of ISO/IEC MPEG & ITU-T VCEG, ISO/IEC JTC1/SC291WG11, N6540, Jul. 2004, Redmond, WA, USA.
Kimata et al., "Free-viewpoint Video Communication Using Multi-view Video Coding", NTT Technical Review, vol. 2, No. 8, Aug. 2004, pp. 21-26.
Mueller et al.: "Multiview Coding using AVC," ISO/IEC JTC1/SC29/WG11, MPEG2006/m12945, Bangkok, Thailand, Jan. 2006, 12 pgs.
Sullivan et al.: "Draft of Version 4 of H.264/AVC," (ITU-T Recommendation H.264 and ISO/IEC 14496-10 (MPEG-4 part 10) Advanced Video Coding), Doc: JVT-M050d4, Palma de Mallorca, ES, Oct. 18-24, 2004, 5 pgs.
Schwarz et al.: "Technical Description of the HHI Proposal for SVC-CE2," Video Standards and Drafts, ISO/IEC JTC1/SC29/WG11, MPEG2004/m11245, Oct. 9, 2004, Palma de Mallorca, Spain, 10 pgs.
Wang et al.: "On SVC High-level Syntax," Video Standards and Drafts, JVT of ISO/IEC MPEG & ITU-T VCEG, Doc: JVT-O011, Apr. 14, 2005, 12 pgs.

* cited by examiner

MULTI-VIEW VIDEO CODING METHOD AND DEVICE USING A BASE VIEW

CROSS-REFERENCE TO RELATED APPLICATIONS

This application claims the benefit, under 35 U.S.C. §365 of International Application PCT/US2007/004997, filed Feb. 27, 2007, which was published in accordance with PCT Article 21(2) on Nov. 8, 2007 in English and which claims the benefit of U.S. provisional patent application No. 60/787,092 filed Mar. 29, 2006. Additionally, the disclosure of this application is closely related to disclosed subject matter included in International Application PCT/US2007/004971, filed Feb. 27, 2007, which was published in accordance with PCT Article 21(2) on Nov. 8, 2007 in English and which also claims the benefit of U.S. provisional patent application No. 60/787,092 filed Mar. 29, 2006, and which is commonly assigned and incorporated by reference in its entirety. Furthermore, the disclosure of this application is closely related to disclosed subject matter included in International Application PCT/US2007/004972, filed Feb. 27, 2007, which was published in accordance with PCT Article 21(2) on Nov. 8, 2007 in English and which also claims the benefit of U.S. provisional patent application No. 60/787,092 filed Mar. 29, 2006, and which is commonly assigned and incorporated by reference in its entirety.

TECHNICAL FIELD

The present principles relate generally to video encoding and decoding and, more particularly, to methods and apparatus for use in a multi-view video coding system.

BACKGROUND

In the current implementation of Multi-view Video Coding (MVC) compliant with the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"), there is no provision to identify a specific view and to signal the camera parameters. This view information is needed for several reasons. View scalability, view random access, parallel processing, view generation, and view synthesis are all Multi-view Video Coding requirements which utilize the view information. Moreover, several of these requirements also utilize camera parameters which are currently not passed in a standardized way.

A method has been proposed to enable efficient random access in multi-view compressed bit streams. In the proposed method, a V-picture type and a View Dependency Supplemental Enhancement Information (SEI) message are defined. A feature required in the proposed V-picture type is that V-pictures shall have no temporal dependence on other pictures in the same camera and may only be predicted from pictures in other cameras at the same time. The proposed View Dependency Supplemental Enhancement Information message will describe exactly which views a V-picture, as well as the preceding and following sequences of pictures, may depend on. The following are the details of the proposed changes.

With respect to V-Picture syntax and semantics, a particular syntax table relating to the MPEG-4 AVC standard is extended to include a Network Abstraction Layer (NAL) unit type of 14 corresponding to a V-picture. Also, the V-picture type is defined to have the following semantics:

V-picture: A coded picture in which all slices reference only slices with the same temporal index (i.e., only slices in other views and not slices in the current view). When a V-picture would be output or displayed, it also causes the decoding process to mark all pictures from the same view which are not IDR-pictures or V-pictures and which precede the V-picture in output order to be marked as "unused for reference". Each V-picture shall be associated with a View Dependency SEI message occurring in the same NAL.

With respect to the view dependency Supplemental Enhancement Information message syntax and semantics, a View Dependency Supplemental Enhancement Information message is defined with the following syntax:

```
view_dependency ( payloadSize ) {
    num_seq_reference_views ue(v)
    seq_reference_view_0 ue(v)
    seq_reference_view_1 ue(v)
    ...
    seq_reference_view_N ue(v)
    num_pic_reference_views ue(v)
    pic_reference_view_0 ue(v)
    pic_reference_view_1 ue(v)
    ...
    pic_reference_view_N ue(v)
``` where num_seq_reference_views/num_pic_reference_views denotes the number of potential views that can be used as a reference for the current sequence/picture, and seq_reference_view_i/pic_reference_view_i denotes the view number for the $i^{th}$ reference view.

The picture associated with a View Dependency Supplemental Enhancement Information message shall only reference the specified views described by pic_reference_view_i. Similarly, all subsequent pictures in output order of that view until the next View Dependency Supplemental Enhancement Information message in that view shall only reference the specified views described by seq_reference_view_i.

A View Dependency Supplemental Enhancement Information message shall be associated with each Instantaneous Decoding Refresh (IDR) picture and V-picture.

At least one drawback of this method is the complexity introduced in the decoder due to the dependency being recursively obtained. Additionally, this method requires that every V-picture carry an SEI message (which is a non-normative part of the MPEG-4 AVC standard), resulting in the dependency being unable to be used for normative behavior such as reference picture selection.

SUMMARY

These and other drawbacks and disadvantages of the prior art are addressed by the present principles, which are directed to methods and apparatus for use in a multi-view video coding system.

According to an aspect of the present principles, there is provided an apparatus. The apparatus includes an encoder for encoding at least two views corresponding to multi-view video content into a resultant bitstream, wherein the resultant bitstream is encoded to include view specific information. The view specific information indicates a decoding interdependency between at least some of the at least two views.

According to another aspect of the present principles, there is provided a method. The method includes encoding at least two views corresponding to multi-view video content into a resultant bitstream, wherein the resultant bitstream is encoded to include view specific information. The view specific information indicates a decoding interdependency between at least some of the at least two views.

According to yet another aspect of the present principles, there is provided an apparatus. The apparatus includes a decoder for decoding at least two views corresponding to multi-view video content from a bitstream, wherein the bitstream is decoded to determine view specific information included therein, the view specific information indicating a decoding interdependency between at least some of the at least two views.

According to still another aspect of the present principles, there is provided a method. The method includes decoding at least two views corresponding to multi-view video content from a bitstream, wherein the bitstream is decoded to determine view specific information included therein. The view specific information indicates a decoding interdependency between at least some of the at least two views.

According to a further aspect of the present principles, there is provided an apparatus. The apparatus includes an encoder for encoding at least two views corresponding to multi-view video content by defining as a base view any of the at least two views that, for a decoding thereof, is independent of any other of the at least two views.

According to a yet further aspect of the present principles, there is provided a method. The method includes encoding at least two views corresponding to multi-view video content by defining as a base view any of the at least two views that, for a decoding thereof, is independent of any other of the at least two views.

According to a still further aspect of the present principles, there is provided an apparatus. The apparatus includes a decoder for decoding at least two views corresponding to multi-view video content, wherein the decoder determines which, if any, of the at least two views is a base view that, for a decoding thereof, is independent of any other of the at least two views.

According to an additional aspect of the present principles, there is provided a method. The method includes decoding at least two views corresponding to multi-view video content, wherein the decoding step determines which, if any, of the at least two views is a base view that, for a decoding thereof, is independent of any other of the at least two views.

According to an aspect of the present principles, there is provided an apparatus. The apparatus includes an encoder for encoding at least two views corresponding to multi-view video content by encoding at least one of the at least two views in a resultant bitstream that is syntax compliant with the International Organization for Standardization/International Electrotechnical Commission Moving Picture Experts Group-4 Part 10 Advanced Video Coding standard/International Telecommunication Union, Telecommunication Sector H.264 recommendation, for backwards compatibility therewith.

According to another aspect of the present principles, there is provided a method. The method includes encoding at least two views corresponding to multi-view video content by encoding at least one of the at least two views in a resultant bitstream that is syntax compliant with the International Organization for Standardization/International Electrotechnical Commission Moving Picture Experts Group-4 Part 10 Advanced Video Coding standard/International Telecommunication Union, Telecommunication Sector H.264 recommendation, for backwards compatibility therewith.

According to yet another aspect of the present principles, there is provided an apparatus. The apparatus includes a decoder for decoding at least two views corresponding to multi-view video content, wherein at least one of the at least two views is included in a bitstream that is syntax compliant with the International Organization for Standardization/International Electrotechnical Commission Moving Picture Experts Group-4 Part 10 Advanced Video Coding standard/International Telecommunication Union, Telecommunication Sector H.264 recommendation, for backwards compatibility therewith.

According to still another aspect of the present principles, there is provided a method. The method includes decoding at least two views corresponding to multi-view video content, wherein at least one of the at least two views is included in a bitstream that is syntax compliant with the International Organization for Standardization/International Electrotechnical Commission Moving Picture Experts Group-4 Part 10 Advanced Video Coding standard/International Telecommunication Union, Telecommunication Sector H.264 recommendation, for backwards compatibility therewith.

According to a further aspect of the present principles, there is provided an apparatus. The apparatus includes an encoder for encoding at least one of at least two views corresponding to multi-view video content by selecting between one of two-pre-defined slice types.

According to a yet further aspect of the present principles, there is provided a method. The method includes encoding at least one of at least two views corresponding to multi-view video content by selecting between one of two-pre-defined slice types.

According to a still further aspect of the present principles, there is provided an apparatus. The apparatus includes a decoder for decoding at least one of at least two views corresponding to multi-view video content by determining between one of two-pre-defined slice types.

According to an additional aspect of the present principles, there is provided a method. The method includes decoding at least one of at least two views corresponding to multi-view video content by determining between one of two-pre-defined slice types.

According to an aspect of the present principles, there is provided an apparatus. The apparatus includes an encoder for encoding at least two views corresponding to multi-view content into a resultant bitstream, wherein the resultant bitstream is encoded to include at least one camera parameter corresponding to at least one of the at least two views.

According to another aspect of the present principles, there is provided a method. The method includes encoding at least two views corresponding to multi-view content into a resultant bitstream, wherein the resultant bitstream is encoded to include at least one camera parameter corresponding to at least one of the at least two views.

According to yet another aspect of the present principles, there is provided an apparatus. The apparatus includes a decoder for decoding at least two views corresponding to multi-view content from a bitstream, wherein the bitstream is decoded to determine at least one camera parameter included therein. The at least one camera parameter corresponds to at least one of the at least two views.

According to still another aspect of the present principles, there is provided a method. The method includes decoding at least two views corresponding to multi-view content from a bitstream, wherein the bitstream is decoded to determine at least one camera parameter included therein. The at least one camera parameter corresponds to at least one of the at least two views.

According to a further aspect of the present principles, there is provided an apparatus. The apparatus includes an encoder for encoding at least two views corresponding to multi-view video content into a resultant bitstream, wherein the resultant bitstream is encoded to include at least one syntax element related to at least one camera parameter for at least one of the at least two views.

According to a yet further aspect of the present principles, there is provided a method. The method includes encoding at least two views corresponding to multi-view video content into a resultant bitstream, wherein the resultant bitstream is encoded to include at least one syntax element related to at least one camera parameter for at least one of the at least two views.

According to a still further aspect of the present principles, there is provided an apparatus. The apparatus includes a decoder for decoding at least two views corresponding to multi-view video content from a bitstream, wherein the bitstream is decoded to determine at least one camera parameter for at least one of the at least two views based on at least one syntax element included in the bitstream.

According to an additional aspect of the present principles, there is provided a method. The method includes decoding at least two views corresponding to multi-view video content from a bitstream, wherein the bitstream is decoded to determine at least one camera parameter for at least one of the at least two views based on at least one syntax element included in the bitstream.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
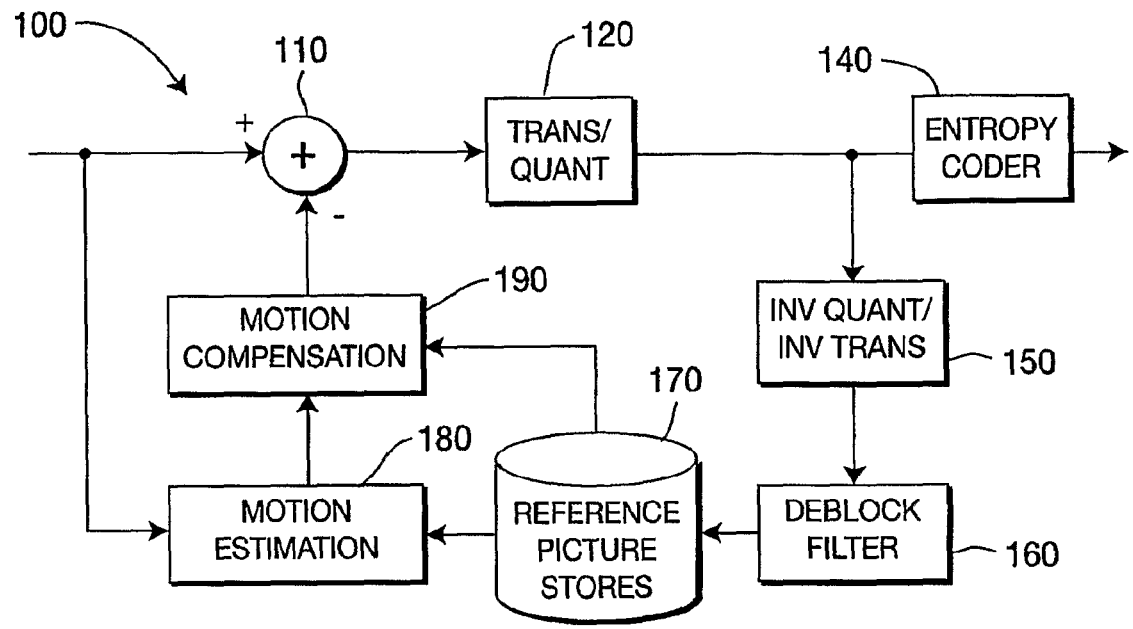
FIG. 1 is a block diagram for an exemplary video encoder to which the present principles may be applied, in accordance with an embodiment of the present principles.

The present principles are directed to methods and apparatus for use in a multi-view video coding system.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Turning to FIG. 1, an exemplary video encoder to which the present principles may be applied is indicated generally by the reference numeral 100.

An input to the video encoder 100 is connected in signal communication with a non-inverting input of a combiner 110.

The output of the combiner 110 is connected in signal communication with a transformer/quantizer 120. The output of the transformer/quantizer 120 is connected in signal communication with an entropy coder 140. An output of the entropy coder 140 is available as an output of the encoder 100.

The output of the transformer/quantizer 120 is further connected in signal communication with an inverse transformer/quantizer 150. An output of the inverse transformer/quantizer 150 is connected in signal communication with an input of a deblock filter 160. An output of the deblock filter 160 is connected in signal communication with reference picture stores 170. A first output of the reference picture stores 170 is connected in signal communication with a first input of a motion estimator 180. The input to the encoder 100 is further connected in signal communication with a second input of the motion estimator 180. The output of the motion estimator 180 is connected in signal communication with a first input of a motion compensator 190. A second output of the reference picture stores 170 is connected in signal communication with a second input of the motion compensator 190. The output of the motion compensator 190 is connected in signal communication with an inverting input of the combiner 110.

Figure 2:
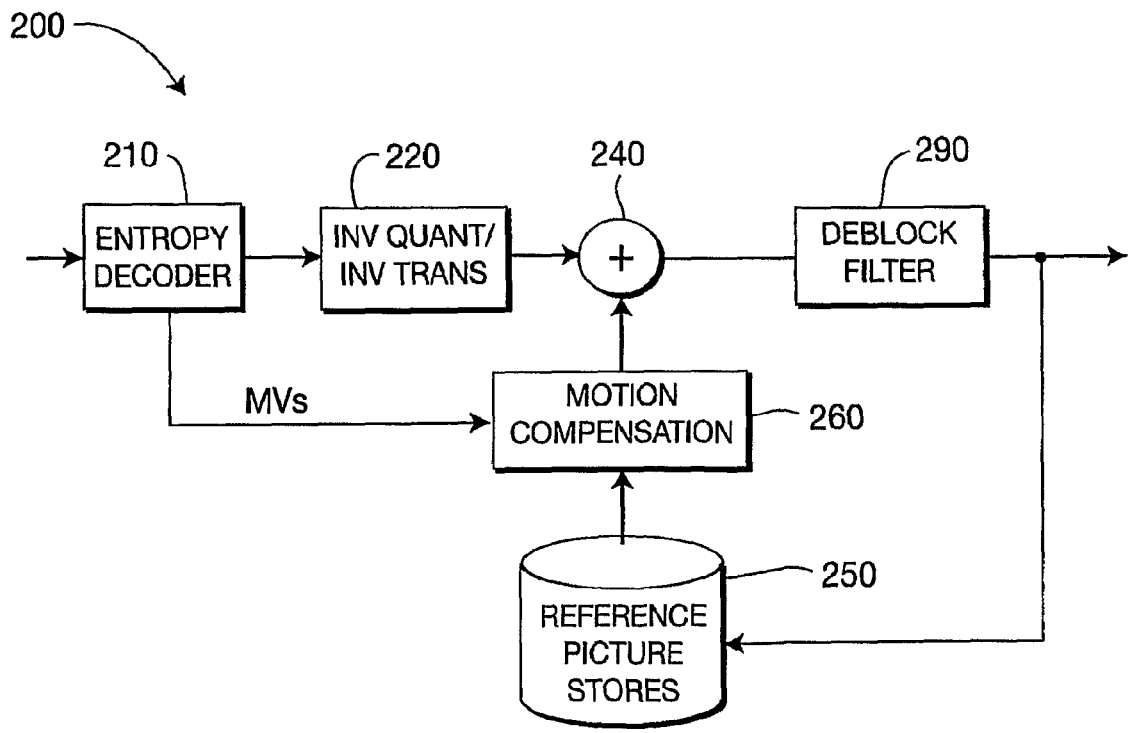
FIG. 2 is a block diagram for an exemplary video decoder to which the present principles may be applied, in accordance with an embodiment of the present principles.

Turning to FIG. 2, an exemplary video decoder to which the present principles may be applied is indicated generally by the reference numeral 200.

The video decoder 200 includes an entropy decoder 210 for receiving a video sequence. A first output of the entropy decoder 210 is connected in signal communication with an input of an inverse quantizer/transformer 220. An output of the inverse quantizer/transformer 220 is connected in signal communication with a first non-inverting input of a combiner 240.

The output of the combiner 240 is connected in signal communication with an input of a deblock filter 290. An output of the deblock filter 290 is connected in signal communication with an input of a reference picture stores 250. The output of the reference picture stores 250 is connected in signal communication with a first input of a motion compensator 260. An output of the motion compensator 260 is connected in signal communication with a second non-inverting input of the combiner 240. A second output of the entropy decoder 210 is connected in signal communication with a second input of the motion compensator 260. The output of the deblock filter 290 is available as an output of the video decoder 200.

In an embodiment of the present principles, a high level syntax is proposed for efficient processing of a multi-view sequence. In particular, we propose creating a new parameter set called View Parameter Set (VPS) with its own NAL unit type and two more new NAL unit types to support multi-view slices, with the NAL unit types including a view identifier (id) in the NAL header to identify to which view the slice belongs. For view scalability and backward compatibility with decoders compliant with the MPEG-4 AVC standard, we propose to maintain one MPEG-4 AVC compliant view which we call an "MPEG-4 AVC compliant Base View".

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, picture parameter set level, and sequence parameter set level.

In the current implementation of the Multi-view Video Coding system described above as having no provision to identify a specific view and to signal camera parameters, different views are interleaved to form a single sequence instead of treating the different views as separate views. Since the syntax is compatible with the MPEG-4 AVC standard, as noted above, it is presently not possible to identify which view a given slice belongs to. This view information is needed for several reasons. View scalability, view random access, parallel processing, view generation, and view synthesis are all Multi-view Video Coding requirements which need to identify a view. For efficient support of view random access and view scalability, it is important for the decoder to know how different pictures depend on each other, so only pictures that are necessary are decoded. Camera parameters are needed for view synthesis. If view synthesis is eventually used in the decoding loop, a standardized way of signaling camera parameters needs to be specified. In accordance with an embodiment, a view parameter set is used.

In an embodiment, it is presumed that one view is needed that is fully backward compatible with the MPEG-4 AVC standard for the purpose of supporting non-MVC compatible but MPEG-4 AVC compatible decoders. In an embodiment, it is presumed that there will be views that are independently decodable to facilitate fast view random access. We refer to these views as "base views". A base view may or may not be compatible with the MPEG-4 AVC standard, but an MPEG-4 AVC compatible view is always a base view.

Figure 3:
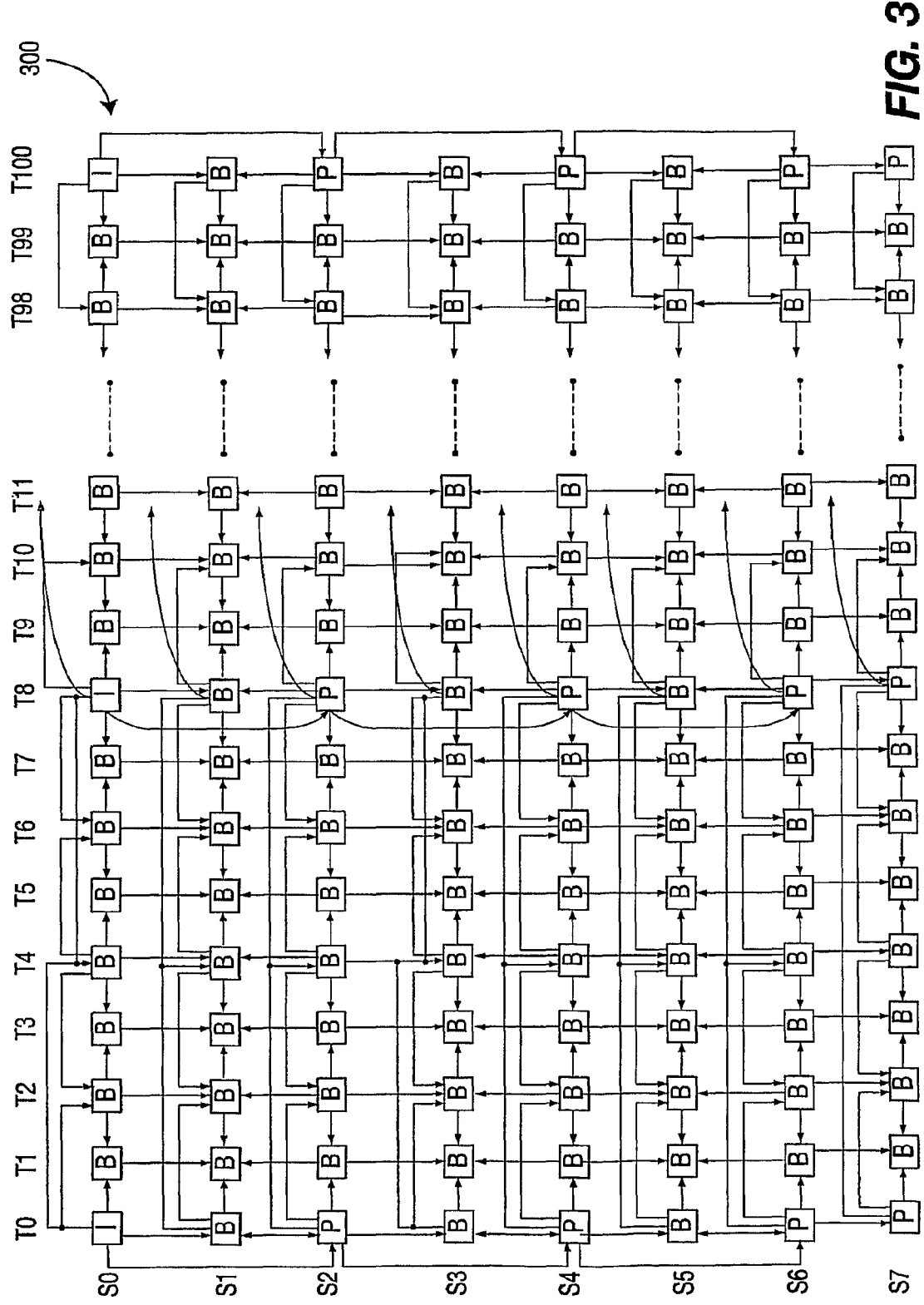
FIG. 3 is a diagram for an inter-view-temporal prediction structure based on the MPEG-4 AVC standard, using hierarchical B pictures, in accordance with an embodiment of the present principles.

Turning to FIG. 3, an inter-view-temporal prediction structure based on the MPEG-4 AVC standard, using hierarchical B pictures, is indicated generally by the reference numeral 300. In FIG. 3, the variable I denotes an intra coded picture, the variable P denotes a predictively coded picture, the variable B denotes a bi-predictively coded picture, the variable T denotes a location of a particular picture, and the variable S denotes a particular view to which corresponds a particular picture.

In accordance with an embodiment, the following terms are defined:

Anchor picture is defined as a picture the decoding of which does not involve any picture sampled at a different time instance. An anchor picture is signaled by setting the nal_ref_idc to 3. In FIG. 3, all pictures in locations T0, T8 . . . , and T100 are examples of anchor pictures.

Non-anchor picture is defined as a picture which does not have the above constraint specified for an anchor picture.

Base view is a view which does not depend on any other view and can be independently decoded. In FIG. 3, view S0 is an example of base view.

Also, in an embodiment, a new parameter set is proposed called the View Parameter Set with its own NAL unit type and two new NAL unit types to support Multi-view Video Coding slices. We also modify the slice header syntax to indicate the view_id and the view parameter set to be used.

The MPEG-4 AVC standard includes the following two parameter sets: (1) Sequence Parameter Set (SPS), which includes information that is not expected to change over an entire sequence; and (2) Picture Parameter Set (PPS), which includes information that is not expected to change for each picture.

Since Multi-view Video Coding has additional information which is specific to each view, we have created a separate View Parameter Set (VPS) in order to transmit this information. All the information that is needed to determine the dependency between the different views is indicated in the View Parameter Set. The syntax table for the proposed View Parameter Set is shown in TABLE 1 (View Parameter Set RBSP syntax). This View Parameter Set is included in a new NAL unit type, for example, type 14 as shown in TABLE 2 (NAL unit type codes).

In accordance with the description of the present invention, the following terms are defined:

view_parameter_set_id identifies the view parameter set that is referred to in the slice header. The value of the view_parameter_set_id shall be in the range of 0 to 255.

number_of_views_minus_1 plus 1 identifies the total number of views in the bitstream. The value of the number_of_view_minus_1 shall be in the range of 0 to 255.

avc_compatible_view_id indicates the view_id of the AVC compatible view. The value of avc_compatible_view_id shall be in the range of 0 to 255.

is_base_view_flag[i] equal to 1 indicates that the view i is a base view and is independently decodable. is_base_view_flag[i] equal to 0 indicates that the view i is not a base view. The value of is_base_view_flag [i] shall be equal to 1 for an AVC compatible view i.

depepdency_update_flag equal to 1 indicates that dependency information for this view is updated in the VPS. depedency_update_flag equal to 0 indicates that the dependency information for this view is not updated and should not be changed.

anchor_picture_dependency_maps[i][j] equal to 1 indicates the anchor pictures with view_id equal to j will depend on the anchor pictures with view_id equal to i.

non_anchor_picture_dependency_maps[i][j] equal to 1 indicates the non-anchor pictures with view_id equal to j will depend on the non-anchor pictures with view_id equal to i. non_anchor_picture_dependency_maps[i][j] is present only when anchor_picture_dependency_maps[i][i] equals 1. If anchor_picture_dependency_maps[i][j] is present and is equal to zero non_anchor_picture_dependency_maps[i][j] shall be inferred as being equal to 0.

TABLE 1

| view_parameter_set_rbsp( ) { | C | Descriptor |
|---|---|---|
| view_parameter_set_id | 0 | ue(v) |
| number_of_views_minus_1 | 0 | ue(v) |
| avc_compatible_view_id | 0 | ue(v) |
| for( i = 0; i <= number_of_views_minus_1; i++ ) { | | |
|     is_base_view_flag[i] | 0 | u(1) |
|     dependency_update_flag | 0 | u(1) |
|     if (dependency_update_flag == 1) { | | |
|         for(j = 0; j <=number_of_views_1; j++) { | | |
|             anchor_picture_dependency_maps[i][j] | 0 | f(1) |
|             if (anchor_picture_dependency_maps[i][j] == 1) | | |
|                 non_anchor_picture_dependency_maps[i][j] | 0 | f(1) |
|         } | | |
|     } | | |
| } | | |
| for( i = 0; i <= number_of_views_minus_1; i++ ) { | | |
|     camera_parameters_present_flag | 0 | u(1) |
|     if (camera_parameters_present_flag == 1) { | | |
|         camera_parameters_1_1[i] | 0 | f(32) |
|         *** | | |
|         camera_parameters_3_4[i] | 0 | f(32) |
|     } | | |
| } | | |
| } | | |

TABLE 2

| nal_unit_type | Content of NAL unit and RBSP syntax structure | C |
|---|---|---|
| 0 | Unspecified | |
| 1 | Coded slice of a non-IDR picture<br>slice_layer_without_partitioning_rbsp( ) | 2, 3, 4 |
| 2 | Coded slice data partition A<br>slice_data_partition_a_layer_rbsp( ) | 2 |
| 3 | Coded slice data partition B<br>slice_data_partition_b_layer_rbsp( ) | 3 |
| 4 | Coded slice data partition C<br>slice_data_partition_c_layer_rbsp( ) | 4 |
| 5 | Coded slice of an IDR picture<br>slice_layer_without_partitioning_rbsp( ) | 2, 3 |
| 6 | Supplemental enhancement information (SEI)<br>sei_rbsp( ) | 5 |
| 7 | Sequence parameter set<br>seq_parameter_set_rbsp( ) | 0 |
| 8 | Picture parameter set<br>pic_parameter_set_rbsp( ) | 1 |
| 9 | Access unit delimiter<br>access_unit_delimiter_rbsp( ) | 6 |
| 10 | End of sequence<br>end_of_seq_rbsp( ) | 7 |
| 11 | End of stream<br>end_of_stream_rbsp( ) | 8 |
| 12 | Filler data<br>filler_data_rbsp( ) | 9 |

TABLE 2-continued

| nal_unit_type | Content of NAL unit and RBSP syntax structure | C |
|---|---|---|
| 13 | Sequence parameter set extension seq_parameter_set_extension_rbsp( ) | 10 |
| 14 | View parameter set view_parameter_set_rbps( ) | 11 |
| 15 ... 18 | Reserved | |
| 19 | Coded slice of an auxiliary coded picture without partitioning slice_layer_without_partitioning_rbsp( ) | 2, 3, 4 |
| 20 | Coded slice of a non-IDR picture in scalable extension slice_layer_in_scalable_extension_rbsp( ) | 2, 3, 4 |
| 21 | Coded slice of an IDR picture in scalable extension slice_layer_in_scalable_extension_rbsp( ) | 2, 3 |
| 22 | Coded slice of a non-IDR picture in multi-view extension slice_layer_in_mvc_extension_rbsp( ) | 2, 3, 4 |
| 23 | Coded slice of an IDR picture in multi-view extension slice_layer_in_mvc_extension_rbsp( ) | 2, 3 |
| 24 ... 31 | Unspecified | |

Optional parameters in the View Parameter Set include the following:

camera_parameters_present_flag equal to 1 indicates that a projection matrix is signaled as follows.

camera_parameters, presuming camera parameter is conveyed in the form of a 3×4 projection matrix P, which can be used to map a point in the 3D world to the 2D image coordinate:

$$I = P * [X_W; Y_W; Z_W; 1]$$

where I is in homogeneous coordinates $I = [\lambda \cdot I_x; \lambda \cdot I_y; \lambda]$.

Each element camera_parameters_*_* can be represented according to the IEEE single precision floating point (32 bits) standard.

The advantage of putting this information in a separate parameter set is that we still maintain Sequence Parameter Sets (SPS) and Picture Parameter Sets (PPS) that are compatible with the MPEG-4 AVC standard. If we put this information in a Sequence Parameter Set or a Picture Parameter Set then, for each view, we need to send a separate Sequence Parameter Set and Picture Parameter Set. This is too restrictive. Also, this information does not fit well in either a Sequence Parameter Set or a Picture Parameter Set. Another reason is that since we propose to have an MPEG-4 AVC standard compatible base view we would have to use separate (MPEG-4 AVC compatible) Sequence Parameter Sets and Picture Parameter Sets for such a view and a separate Sequence Parameter Sets/Picture Parameter Sets (with view specific information) for all other views.

Placing all the dependency information in a single View Parameter Set at the very beginning of the sequence is very beneficial. The decoder can create a map using all the dependency information once it receives the View Parameter Set. This enables it to know before it receives any slice which views are needed for decoding a particular view. As a result of this, we only need to parse the slice header to obtain the view_id and determine if this view is needed to decode a target view as indicated by a user. Thus, we do not need to buffer any frames or wait until a certain point to determine which frames are needed for decoding a particular view.

The dependency information and whether it is a base view is indicated in the View Parameter Set. Even an MPEG-4 AVC compatible base view has associated with it information that is specific to that view (e.g., camera parameters). This information may be used by other views for several purposes including view interpolation/synthesis. We propose to support only one MPEG-4 AVC compatible view since if there are multiple MPEG-4 AVC compatible views, this makes it difficult to identify for each such slice which view it belongs to and a non-Multi-view Video Coding decoder can easily get confused.

By restricting it to just one such view, it is guaranteed that a non-Multi-view Video Coding decoder will be able to correctly decode the view and a Multi-view Video Coding decoder can easily identify such a view from the View Parameter Set using the syntax avc_compatible_view_id. All other base views (non-MPEG-4 AVC compatible) can be identified using the is_base_view_flag.

A new slice header for Multi-view Video Coding slices is proposed. In order to support view scalability, view random access, and so forth, we need to know which views the current slice depends upon. For view synthesis and view interpolation we may potentially also need camera parameters. This information is present in the View Parameter Set as shown above in TABLE 1. The View Parameter Set is identified using the view_parameter_set_id. We propose to add the view_parameter_set_id in the slice header of all the non-MPEG-4 AVC compatible slices as shown in TABLE 3 (Slice Header Syntax). The view_id information is needed for several Multi-view Video Coding requirements including view interpolation/synthesis, view random access, parallel processing, and so forth. This information can also be useful for special coding modes that only relate to cross-view prediction. In order to find the corresponding parameters from the View Parameter Set for this view, we need to send the view_id in the slice header.

TABLE 3

| slice_header( ) { | C | Descriptor |
|---|---|---|
| first_mb_in_slice | 2 | ue(v) |
| slice_type | 2 | ue(v) |
| pic_parameter_set_id | 2 | ue(v) |
| if (nal_unit_type == 22 \|\| nal_unit_type == 23) { | | |
| view_parameter_set_id | 2 | ue(v) |
| view_id | 2 | ue(v) |
| } | | |
| frame_num | 2 | u(v) |
| if( !frame_mbs_only_flag ) { | | |
| field_pic_flag | 2 | u(1) |
| if( field_pic_flag ) | | |
| bottom_field_flag | 2 | u(1) |
| } | | |
| ........ | | |
| } | | |

For the new Multi-view Video Coding slices we propose to create new NAL unit types for each slice type (Instantaneous Decoding Refresh (IDR) and non-IDR). We propose to use type 22 for IDR slices and type 23 for non-IDR slices as shown in TABLE 2.

view_parameter_set_id specifies the view parameter set in use. The value of the view_parameter_set_id shall be in the range 0 to 255.

view_id indicates the view id of the current view. The value of the view_parameter_set_id shall be in the range 0 to 255.

An example of view random access will now be described in accordance with an embodiment of the present principles.

View random access is a Multi-view Video Coding requirement. The goal is to get access to any view with minimum decoding effort. Let us consider a simple example of view random access for the prediction structure shown in FIG. 3.

Suppose a user requests to decode view S3. From FIG. 3, we see that this view depends on view S0, view S2, and view S4. An example View Parameter Set is illustrated below.

Let us presume that the view_id for the views are numbered consecutively from 0 to 7 in the slice header syntax and there is only one View Parameter Set present with view_parameter_ set equal to 0. number_of_views_minus_1 is set to 7. avc_compatible_view_id could be set to 0.

For views S0, is_base_view_flag is set to 1 and for other views it is set to 0. The dependency map for S0, S1, S2, S3, and S4 will look as shown in TABLE 4A (Dependency table for S0 anchor_picture_dependency_map) and TABLE 4B (dependency table for S0 non_anchor_picture_dependency_map). The dependency map for the other views can be written in a similar way.

Once this table is available at the decoder, the decoder can easily determine if a slice it receives is needed to decode a particular view. The decoder only needs to parse the slice header to determine the view_id of the current slice and for the target view S3 it can look up the S3 columns in the two tables (TABLE 4a and TABLE 4B) to determine whether or not it should keep the current slice. The decoder needs to distinguish between anchor pictures and non-anchor pictures since they may have different dependencies as can be seen from TABLE 4a and TABLE 4b. For the target view S3, we need to decode the anchor pictures of views S0, S2, and S4 but only need to decode the non-anchor pictures of views S2 and S4.

TABLE 4A

| i\j | S0 | S1 | S2 | S3 | S4 | S5 | S6 | S7 |
|---|---|---|---|---|---|---|---|---|
| S0 | 0 | 1 | 1 | 1 | 1 | 1 | 1 | 1 |
| S1 | 0 | 0 | 0 | 0 | 0 | 0 | 0 | 0 |
| S2 | 0 | 1 | 0 | 1 | 1 | 1 | 1 | 1 |
| S3 | 0 | 0 | 0 | 0 | 0 | 0 | 0 | 0 |
| S4 | 0 | 0 | 0 | 1 | 0 | 1 | 1 | 1 |

TABLE 4B

| i\j | S0 | S1 | S2 | S3 | S4 | S5 | S6 | S7 |
|---|---|---|---|---|---|---|---|---|
| S0 | 0 | 1 | 0 | 0 | 0 | 0 | 0 | 0 |
| S1 | 0 | 0 | 0 | 0 | 0 | 0 | 0 | 0 |
| S2 | 0 | 1 | 0 | 1 | 0 | 0 | 0 | 0 |
| S3 | 0 | 0 | 0 | 0 | 0 | 0 | 0 | 0 |
| S4 | 0 | 0 | 0 | 1 | 0 | 1 | 0 | 0 |

Figure 4:
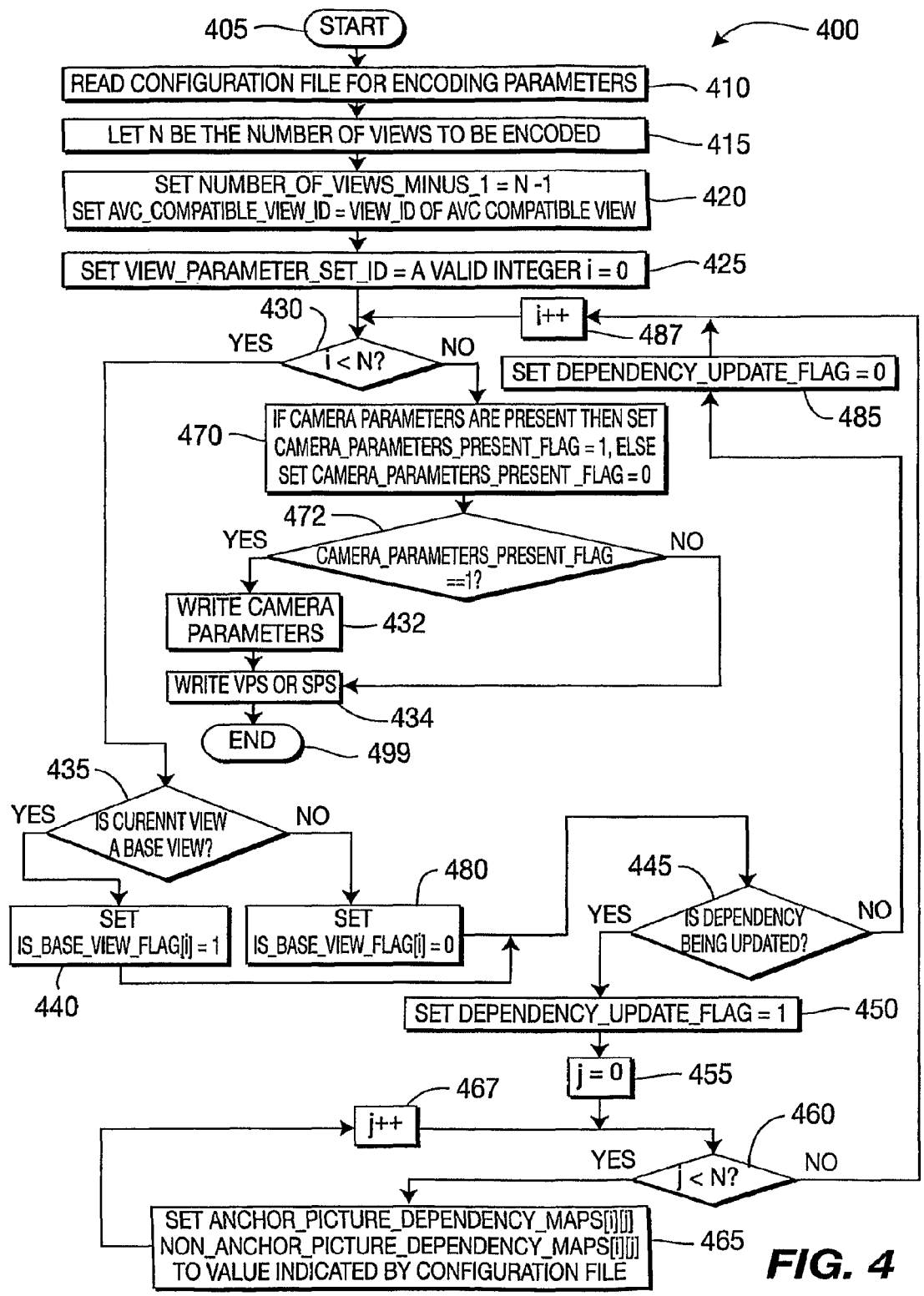
FIG. 4 is a flow diagram for an exemplary method for encoding multiple views of multi-view video content, in accordance with an embodiment of the present principles.

Turning to FIG. 4, an exemplary method for encoding multiple views of multi-view video content is indicated generally by the reference numeral 400.

The method 400 includes a start block 405 that passes control to a function block 410. The function block 410 reads a configuration file for the encoding parameters to be used to encode the multiple views, and passes control to a function block 415. The function block sets N to be equal to the number of views to be encoded, and passes control to a function block 420. The function block 420 sets number_of_views_minus_1 equal to N−1, sets avc_compatible_view_id equal to the view_id of the MPEG-4 AVC compatible view, and passes control to a function block 425. The function block 425 sets view_parameter_set_id equal to a valid integer, initializes a variable i to be equal to zero, and passes control to a decision block 430. The decision block 430 determines whether or not i is greater than N. If so, then control is passed to a decision block 435. Otherwise, control is passed to a function block 470.

The decision block 435 determines whether or not the current view is a base view. If so, then control is passed to a function block 440. Otherwise, control is passed to a function block 480.

The function block 440 sets is_base_view_flag[i] equal to one, and passes control to a decision block 445. The decision block 445 determines whether or not the dependency is being updated. If so, the control is passed to a function block 450. Otherwise, control is passed to a function block 485.

The function block 450 sets dependency_update_flag equal to one, and passes control to a function block 455. The function block 455 sets a variable j equal to 0, and passes control to a decision block 460. The decision block 460 determines whether or not j is less than N. If so, then control is passed to a function block 465. Otherwise, control is passed to the function block 487.

The function block 465 sets anchor_picture_dependency_maps[i][j] and non_anchor_picture_dependency_maps[i][j] to values indicated by configuration file, and passes control to a function block 467. The function block 467 increments the variable j by one, and returns control to the decision block 460.

The function block 470 sets camera_parameters_present_flag equal to one when camera parameters are present, sets camera_parameters_present_flag equal to zero otherwise, and passes control to a decision block 472. The decision block 472 determines whether or not camera_parameters_present_flag is equal to one. If so, then control is passed to a function block 432. Otherwise, control is passed to a function block 434.

The function block 432 writes the camera parameters, and passes control to the function block 434.

The function block 434 writes the View Parameter Set (VPS) or the Sequence Parameter Set (SPS), and passes control to an end block 499.

The function block 480 sets is_base_view_flag[i] equal to zero, and passes control to the decision block 445.

The function block 485 sets dependency_update_flag equal to zero, and passes control to a function block 487. The function block 487 increments the variable i by 1, and returns control to the decision block 430.

Figure 5:
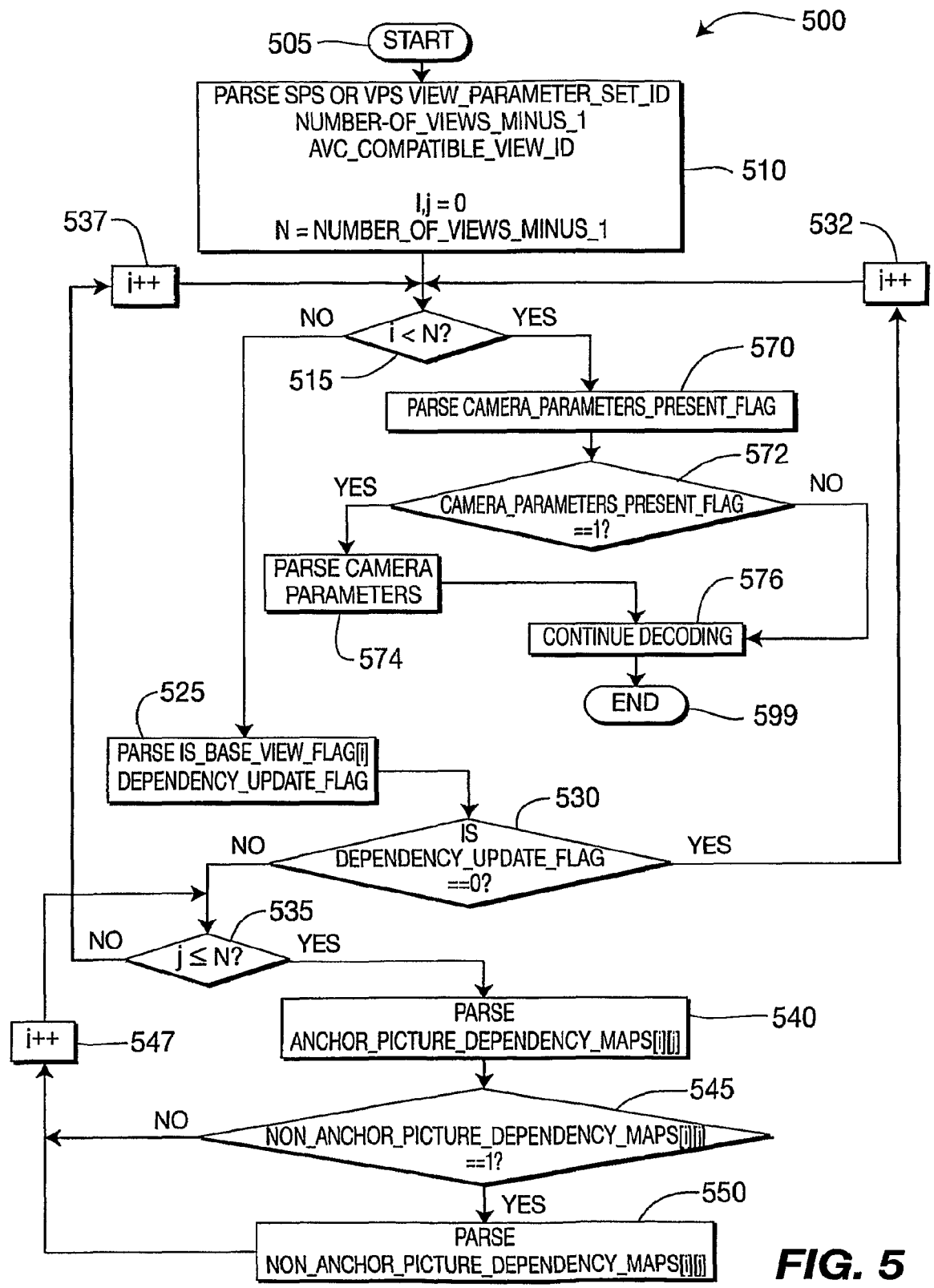
FIG. 5 is a flow diagram for an exemplary method for decoding multiple views of multi-view video content, in accordance with an embodiment of the present principles.

Turning to FIG. 5, an exemplary method for decoding multiple views of multi-view video content is indicated generally by the reference numeral 500.

The method 500 includes a start block 505 that passes control to a function block 510. The function block 510 parses a Sequence Parameter Set (SPS) or View Parameter Set (VPS), view_parameter_set_id, number_of_views_minus_1, avc_compatible_view_id, sets variables I and j equal to zero, sets N equal to number_of_views_minus_1, and passes control to a decision block 515. The decision block 515 determines whether or not i is less than or equal to N. If so, then control is passed to a function block 570. Otherwise, control is passed to a function block 525.

The function block 570 parses camera_parameters_present_flag, and passes control to a decision block 572. The decision block 572 determines whether or not camera_parameters_present_flag is equal to one. If so, then control is passed to a function block 574. Otherwise, control is passed to a function block 576.

The function block 574 parses the camera parameters, and passes control to the function block 576.

The function block 576 continues decoding, and passes control to an end block 599.

The function block 525 parses is_base_view_flag[i] and dependency_update_flag, and passes control to a decision block 530. The decision block 530 determines whether or not dependency_update_flag is equal to zero. If so, then control is passes to a function block 532. Otherwise, control is passed to a decision block 535.

The function block 532 increments i by one, and returns control to the decision block 515.

The decision block 535 determines whether or not j is less than or equal to N. If so, then control is passed to a function block 540. Otherwise, control is passes to a function block 537.

The function block 540 parses anchor_picture_dependency_maps[i][j], and passes control to a decision block 545. The decision block 545 determines whether or not non_anchor_picture_dependency_maps[i][j] is equal to one. If so, then control is passed to a function block 550. Otherwise, control is passes to a function block 547.

The function block 550 parses the non_anchor_picture_dependency_maps[i][j], and passes control to the function block 547.

The function block 547 increments j by one, and returns control to the decision block 535.

The function block 537 increments i by one, and returns control to the function block 515.

A description will now be given of some of the many attendant advantages/features of the present invention, some of which have been mentioned above. For example, one advantage/feature is an apparatus that includes an encoder for encoding at least two views corresponding to multi-view video content into a resultant bitstream, wherein the resultant bitstream is encoded to include view specific information. The view specific information indicates a decoding interdependency between at least some of the at least two views. Another advantage/feature is the apparatus having the encoder as described above, wherein the decoding interdependency allows a corresponding decoding of at least one of the at least two views using only a subset of the at least two views for the corresponding decoding. Yet another advantage/feature is the apparatus having the encoder as described above, wherein the decoding interdependency indicated in the view specific information is used for random access of at least one of the at least two views by dropping slices related to any other ones of the at least two views indicated as non-interdependent with respect to the at least one view. Still another advantage/feature is the apparatus having the encoder as described above, wherein the view specific information is included in a high level syntax. A further advantage/feature is the apparatus having the encoder as described above, wherein the view specific information is included in a parameter set compliant with the International Organization for Standardization/International Electrotechnical Commission Moving Picture Experts Group-4 Part 10 Advanced Video Coding standard/International Telecommunication Union, Telecommunication Sector H.264 recommendation. A yet further advantage/feature is the apparatus having the encoder as described above, wherein the view specific information is included in a View Parameter Set. A still further advantage/feature is the apparatus having the encoder wherein the view specific information is included in a View Parameter Set as described above, wherein the View Parameter Set is assigned a NAL unit type specifically for use only with the View Parameter Set. An additional advantage/feature is the apparatus having the encoder wherein a NAL unit type is assigned specifically for use only with the View Parameter Set as described above, wherein the NAL unit type is 14. Moreover, another advantage/feature is the apparatus having the encoder as described above, wherein the view specific information includes at least one syntax element for indicating a View Parameter Set id. Further, another advantage/feature is the apparatus having the encoder wherein the view specific information includes at least one syntax element for indicating a View Parameter Set id as described above, wherein the at least one syntax element is denoted by a view_parameter_set_id syntax element: Also, another advantage/feature is the apparatus having the encoder as described above, wherein the view specific information includes at least one syntax element for indicating a number of views. Additionally, another advantage/feature is the apparatus having the encoder wherein the view specific information includes at least one syntax element for indicating a number of views as described above, wherein the at least one syntax element is denoted by a number_of_views_minus_1 syntax element. Moreover, another advantage/feature is the apparatus having the encoder as described above, wherein the view specific information includes at least one syntax element for indicating a view id for a particular one of the at least two views, when the particular one of the at least two views is encoded in a resultant bitstream that is compliant with the International Organization for Standardization/International Electrotechnical Commission Moving Picture Experts Group-4 Part 10 Advanced Video Coding standard/International Telecommunication Union, Telecommunication Sector H.264 recommendation. Further, another advantage/feature is the apparatus having the encoder wherein the view specific information includes at least one syntax element for indicating a view id for a particular one of the at least two views as described above, wherein the at least one syntax element is denoted by an avc_compatible_view_id syntax element. Also, another advantage/feature is the apparatus having the encoder as described above, wherein the view specific information includes at least one syntax element or is implicitly derivable from a high level syntax, the at least one syntax element and the high level syntax for indicating that a particular one of the at least two views is compatible with the International Organization for Standardization/International Electrotechnical Commission Moving Picture Experts Group-4 Part 10 Advanced Video Coding standard/International Telecommunication Union, Telecommunication Sector H.264 recommendation. Additionally, another advantage/feature is the apparatus having the encoder wherein the view specific information includes at least one syntax element or is implicitly derivable from a high level syntax as described above, wherein the at least one syntax element is denoted by an is_base_view_flag syntax element. Moreover, another advantage/feature is the apparatus having the encoder as described above, wherein the view specific information includes at least one syntax element for indicating whether dependency information for at least one of the at least two views is present in the resultant bitstream. Further, another advantage/feature is the apparatus having the encoder wherein the view specific information includes at least one syntax element for indicating whether dependency information for at least one of the at least two views is present in the resultant bitstream as described above, wherein the at least one syntax element is denoted by a dependency_update_flag syntax element. Also, another advantage/feature is the apparatus having the encoder as described above, wherein the view specific information includes at least one syntax element for indicating whether at least one anchor picture in a current one of the at least two views is used for decoding any other ones of the at least two views. Moreover, another advantage/feature is the apparatus having the encoder wherein the view specific information includes at least one syntax element for indicating whether at least one anchor picture in a current one of the at least two views is used for decoding any other ones of the at least two views as described above, wherein the at least one syntax element is denoted by an anchor_picture_dependency_maps [i][j] syntax element. Also, another advantage/feature is the apparatus having the encoder as described above, wherein the view specific information includes at least one syntax element for indicating whether at least one non-anchor picture in a current one of the at least two views is used for decoding any other ones of the at least two views. Additionally, another advantage/feature is the apparatus having the encoder wherein the view specific information includes at least one syntax element for indicating whether at least one non-anchor picture in a current one of the at least two views is used for decoding any other ones of the at least two views as described above, wherein the at least one syntax element is denoted by a non_anchor_picture_dependency_maps[i][j] syntax element. Moreover, another advantage/feature is the apparatus having the encoder as described above, wherein the resultant bitstream is encoded to include at least one syntax element related to at least one camera parameter for at least one of the at least two views. Further, another advantage/feature is the apparatus having the encoder wherein the resultant bitstream is encoded to include at least one syntax element related to at least one camera parameter for at least one of the at least two views as described above, wherein the at least one syntax is included in a parameter set corresponding to the resultant bitstream.

Moreover, another advantage/feature is an apparatus that includes an encoder for encoding at least two views corresponding to multi-view video content by defining as a base view any of the at least two views that, for a decoding thereof, is independent of any other of the at least two views.

Further, another advantage/feature is an apparatus that includes an encoder for encoding at least two views corresponding to multi-view video content by encoding at least one of the at least two views in a resultant bitstream that is syntax compliant with the International Organization for Standardization/International Electrotechnical Commission Moving Picture Experts Group-4 Part 10 Advanced Video Coding standard/International Telecommunication Union, Telecommunication Sector H.264 recommendation, for backwards compatibility therewith. Also, another advantage/feature is the apparatus having the encoder as described above, wherein the at least one view is a base view that, for a decoding thereof, is independent of any other of the at least two views. Additionally, another advantage/feature is the apparatus having the encoder as described above, wherein an avc_compatible_view_id syntax element identifies the at least one view as being encoded in the resultant bitstream that is syntax compliant with the International Organization for Standardization/International Electrotechnical Commission Moving Picture Experts Group-4 Part 10 Advanced Video Coding standard/International Telecommunication Union, Telecommunication Sector H.264 recommendation for backwards compatibility.

Moreover, another advantage/feature is an apparatus that includes an encoder for encoding at least one of at least two views corresponding to multi-view video content by selecting between one of two pre-defined slice types. Further, another advantage/feature is the apparatus having the encoder as described above, wherein the two pre-defined slice types are an Instantaneous Decoding Refresh slice type and a non-Instantaneous Decoding Refresh slice type. Also, another advantage/feature is the apparatus having the encoder that selects between the Instantaneous Decoding Refresh slice type and the non-instantaneous Decoding Refresh slice type as described above, wherein NAL unit type 22 is used for the Instantaneous Decoding Refresh slice type and NAL unit type 23 is used for the non-instantaneous Decoding Refresh slices. Additionally, another advantage/feature is the apparatus having the encoder as described above, wherein slice headers for at least one of the at least two slices includes view specific syntax. Moreover, another advantage/feature is the apparatus having the encoder wherein slice headers for at least one of the at least two slices includes view specific syntax as described above, wherein the view specific syntax is conditioned on NAL unit type 23 and NAL unit type 24. Further, another advantage/feature is the apparatus having the encoder wherein slice headers for at least one of the at least two slices includes view specific syntax as described above, wherein the view specific syntax includes a view parameter set identifier and a view identifier. Also, another advantage/feature is the apparatus having the encoder wherein the view specific syntax includes a view parameter set identifier and a view identifier as described above, wherein the view parameter set identifier is denoted by a view_parameter_set_id syntax element and the view identifier is denoted by a view_id syntax element.

Additionally, another advantage/feature is an apparatus that includes an encoder for encoding at least two views corresponding to multi-view content into a resultant bitstream, wherein the resultant bitstream is encoded to include at least one camera parameter corresponding to at least one of the at least two views. Moreover, another advantage/feature is the apparatus having the encoder as described above, wherein the resultant bitstream is encoded to include a View Parameter Set, and the at least one camera parameter is included in the View Parameter Set. Further, another advantage/feature is the apparatus having the encoder as described above, wherein a presence of the at least one camera parameter is indicated by a syntax element. Also, another advantage/feature is the apparatus having the encoder wherein a presence of the at least one camera parameter is indicated by a syntax element as described above, wherein the syntax element is a camera_parameters_present_flag syntax element. Additionally, another advantage/feature is the apparatus having the encoder as described above, wherein the at least one camera parameter is denoted by a camera_parameters syntax element.

Moreover, another advantage/feature is an apparatus that includes an encoder for encoding at least two views corresponding to multi-view video content into a resultant bitstream, wherein the resultant bitstream is encoded to include at least one syntax element related to at least one camera parameter for at least one of the at least two views. Further, another advantage/feature is the apparatus having the encoder as described above, wherein the at least one syntax is a high level syntax element. Also, another advantage/feature is the apparatus having the encoder as described above, wherein the at least one syntax is included in a parameter set corresponding to the resultant bitstream.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding at least two views corresponding to multi-view video content in a resultant bitstream by defining as a base view any of the at least two views that, for a decoding thereof, is independent of any other of the at least two views, wherein an avc_compatible_view_id syntax element identifies which one of base views encoded in the resultant bitstream is syntax compliant with the International Organization for Standardization/International Electrotechnical Commission Moving Picture Experts Group-4 Part 10 Advanced Video Coding standard/International Telecommunication Union, Telecommunication Sector H.264 recommendation for backwards compatibility and wherein a syntax structure is included that indicates dependency information between views, and a Multi-View Video Coding slice header includes a parameter indicative of which view a particular slice belongs.

2. The apparatus of claim 1, wherein the syntax structure is a view parameter set.

3. A method, comprising:
encoding at least two views corresponding to multi-view video content by defining as a base view any of the at least two views that, for a decoding thereof, is independent of any other of the at least two views, wherein an avc_compatible_view_id syntax element identifies which one of base views encoded in the resultant bitstream is syntax compliant with the International Organization for Standardization/International Electrotechnical Commission Moving Picture Experts Group-4 Part 10 Advanced Video Coding standard/International Telecommunication Union, Telecommunication Sector H.264 recommendation for backwards compatibility and wherein a syntax structure is included that indicates dependency information between views, and a Multi-View Video Coding slice header includes a parameter indicative of which view a particular slice belongs.

4. The method of claim 3, wherein the syntax structure is a view parameter set.

5. An apparatus, comprising:
a decoder for decoding at least two views corresponding to multi-view video content, wherein said decoder determines which, if any, of the at least two views is a base view that, for a decoding thereof, is independent of any other of the at least two views, wherein an avc_compatible_view_id syntax element identifies which one of base views encoded in the resultant bitstream is syntax compliant with the International Organization for Standardization/International Electrotechnical Commission Moving Picture Experts Group-4 Part 10 Advanced Video Coding standard/International Telecommunication Union, Telecommunication Sector H.264 recommendation for backwards compatibility and wherein a syntax structure is included that indicates dependency information between views, and a Multi-View Video Coding slice header includes a parameter indicative of which view a particular slice belongs.

6. The apparatus of claim 5, wherein the syntax structure is a view parameter set.

7. A method, comprising:
decoding at least two views corresponding to multi-view video content, wherein said decoding step determines which, if any, of the at least two views is a base view that, for a decoding thereof, is independent of any other of the at least two views, wherein an avc_compatible_view_id syntax element identifies which one of base views encoded in the resultant bitstream is syntax compliant with the International Organization for Standardization/International Electrotechnical Commission Moving Picture Experts Group-4 Part 10 Advanced Video Coding standard/International Telecommunication Union, Telecommunication Sector H.264 recommendation for backwards compatibility and wherein a syntax structure is included that indicates dependency information between views, and a Multi-View Video Coding slice header includes a parameter indicative of which view a particular slice belongs.

8. The method of claim 7, wherein the syntax structure is a view parameter set.

9. A non-transitory storage media having video signal data encoded thereupon for performing a method, the method comprising:
encoding at least two views corresponding to multi-view video content by defining as a base view any of the at least two views that, for a decoding thereof, is independent of any other of the at least two views, wherein an avc_compatible_view_id syntax element identifies which one of base views encoded in the resultant bitstream is syntax compliant with the International Organization for Standardization/International Electrotechnical Commission Moving Picture Experts Group-4 Part 10 Advanced Video Coding standard/International Telecommunication Union, Telecommunication Sector H.264 recommendation for backwards compatibility and wherein a syntax structure is included that indicates dependency information between views, and a Multi-View Video Coding slice header includes a parameter indicative of which view a particular slice belongs.

10. The non-transitory storage media of claim 9, wherein the syntax structure is a view parameter set.

* * * * *